(12) United States Patent
Schwartz

(10) Patent No.: US 11,655,915 B1
(45) Date of Patent: May 23, 2023

(54) PLUMBING TARGET AND PLACEMENT TOOL

(71) Applicant: Curtis Alan Schwartz, Las Vegas, NV (US)

(72) Inventor: Curtis Alan Schwartz, Las Vegas, NV (US)

( * ) Notice: Subject to any disclaimer, the term of this patent is extended or adjusted under 35 U.S.C. 154(b) by 170 days.

(21) Appl. No.: 17/220,491

(22) Filed: Apr. 1, 2021

(51) Int. Cl.
 *F16L 1/10* (2006.01)
(52) U.S. Cl.
 CPC ..................... *F16L 1/10* (2013.01)
(58) Field of Classification Search
 CPC .... E03C 1/021; E03C 1/122; E03C 2001/028; E04G 21/185; F16L 1/10; B28B 23/005
 See application file for complete search history.

(56) References Cited

U.S. PATENT DOCUMENTS

| | | | |
|---|---|---|---|
| 3,815,250 A | 6/1974 | Roodvoets | |
| 4,061,322 A | 12/1977 | Le Blanc | |
| 5,050,824 A | 9/1991 | Hubbard | |
| D362,382 S | 9/1995 | Cloud | |
| 6,077,000 A | 6/2000 | Gibbons et al. | |
| 6,158,066 A | 12/2000 | Brown et al. | |
| D489,960 S | 5/2004 | Grendahl | |
| 6,945,735 B1 | 9/2005 | Doverspike | |
| 8,226,051 B2 | 7/2012 | Brown et al. | |
| 8,376,290 B2 | 2/2013 | Tollefson | |
| D716,638 S | 11/2014 | McDonald | |
| D850,240 S | 6/2019 | Breda | |
| 10,626,596 B2* | 4/2020 | Espinosa | B28B 23/005 |
| 2012/0159758 A1* | 6/2012 | Griffith | E03C 1/021 29/272 |
| 2019/0376622 A1 | 12/2019 | Thuston et al. | |

* cited by examiner

*Primary Examiner* — Lee A Holly
(74) *Attorney, Agent, or Firm* — Goldstein Law Offices, P.C.

(57) ABSTRACT

A plumbing apparatus for placing and supporting a vertical pipe in relation to an installation surface, comprising a plumbing target placement tool, and a plumbing target guide having a pair of securing rods and a pipe supporting member, the plumbing target placement tool allows the securing rods to be precisely embedded into the installation surface over an installation point. The pipe supporting member is attached to the securing rods in vertical alignment with the installation point, and allows the vertical pipe to be vertically inserted, to be supported perpendicularly to the installation surface an in vertical alignment with the installation point. The plumbing apparatus further comprises a horizontal pipe alignment guide that allows horizontal pipe to be positioned along a guide line that runs through the installation point, the horizontal alignment guide being attached to two additional securing rods placed astride the guide line with the horizontal pipe centered therebetween.

17 Claims, 10 Drawing Sheets

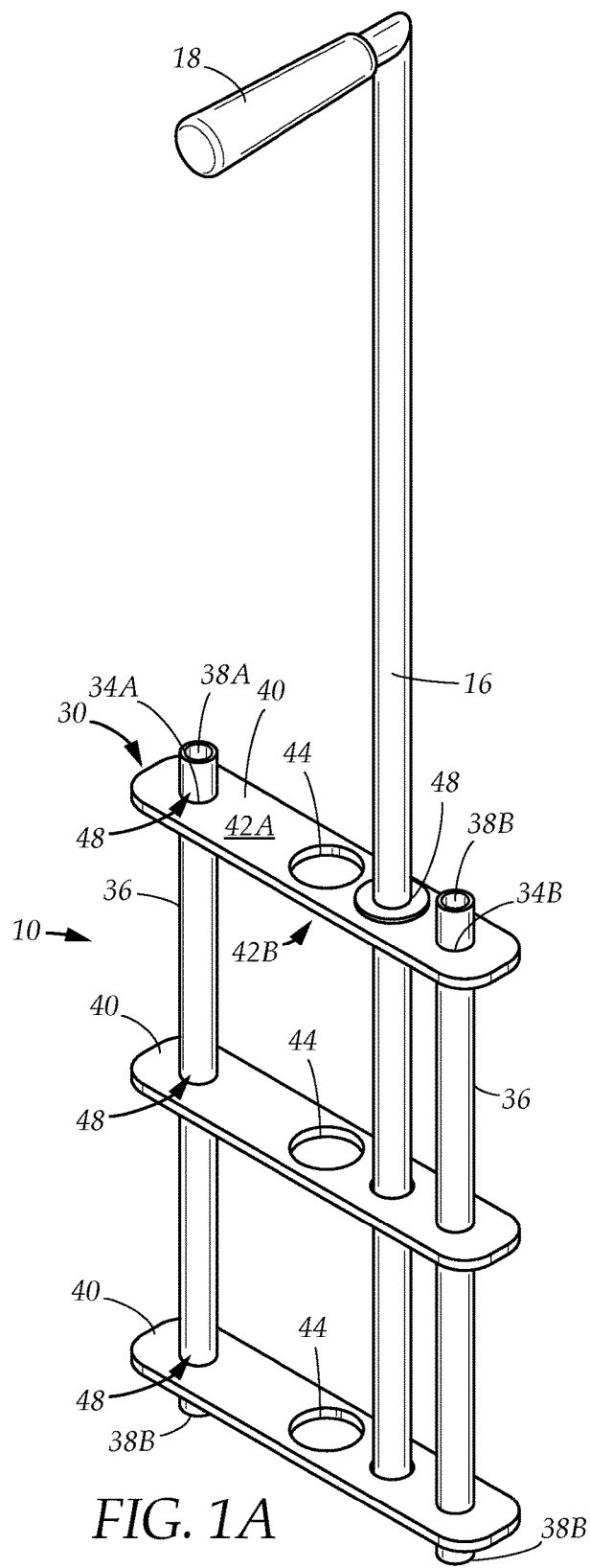
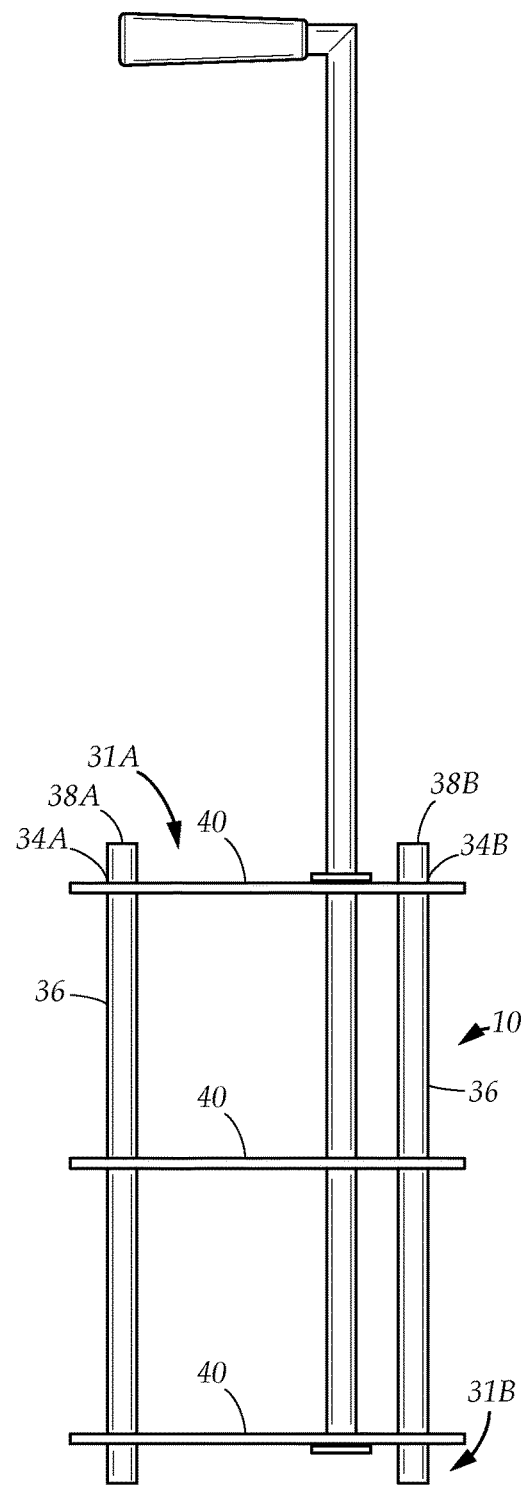
FIG. 1A
FIG. 1B

PLUMBING TARGET AND PLACEMENT TOOL

TECHNICAL FIELD

The present disclosure relates generally to an apparatus for installing plumbing pipe. More particularly, the present disclosure relates to a plumbing apparatus for precisely placing vertical and horizontal pipe in relation to an installation surface.

BACKGROUND

The installation of underground plumbing pipes is challenging due to high skill requirements and budget constraints. Due to the increasing complexity of building layouts, it is difficult to accurately place underground pipes in a timely and efficient manner. One particular challenge involves placing vertical pipes in correct positions, while also ensuring that the vertical pipes are installed perpendicularly in relation to a horizontal reference. Horizontal pipes to which the vertical pipes are to be connected must also be accurately positioned to prevent misalignment.

Various examples of devices for accurately placing and supporting pipes during installation can be found within the prior art. However, these devices are intended for above-ground plumbing, and are intended to be mounted to wall studs or existing structural elements of the building. These devices are unsuitable for underground plumbing work where there are no structural elements in place to which such devices can be mounted. Furthermore, these devices are often large and cumbersome, and are slow to install and disassemble.

A need therefore exists for an apparatus which is portable, quick to place and remove, and allows vertical and horizontal pipes to be accurately placed for installation without reliance on existing structural elements for support or reference.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide an apparatus which allows a vertical pipe to be aligned and supported in relation to an installation surface during a plumbing installation occurring thereon. Accordingly, the present disclosure provides a plumbing apparatus comprising a plumbing target placement tool, and a plumbing target guide. The plumbing target guide has a pair of securing rods and a pipe supporting member. The plumbing target placement tool has a guide structure and a pair of securing rod guides. The plumbing target placement tool is adapted to be positioned upon the installation surface, whereby the securing rod guides allow the securing rods to be perpendicularly embedded into the installation surface. The pipe support member has a pipe guide aperture, and is attached to the securing rods with the pipe guide aperture positioned above the installation surface equidistant between the securing rods. The pipe guide aperture allows the vertical pipe to be inserted lengthwise, after which the vertical pipe is aligned perpendicularly in relation to the installation surface and remains supported therein.

It is another aspect of an example embodiment in the present disclosure to provide an apparatus which allows the vertical pipe to be precisely aligned with an installation point. Accordingly, the guide structure has an alignment means positioned centrally between the securing rod guides, which allows the guide structure to be positioned with the alignment means vertically aligned with the installation point. The securing rods are embedded into the installation surface astride the installation point, with the pipe guide aperture in vertical alignment with the installation point once the pipe supporting member is attached.

It is yet another aspect of the example embodiment in the present disclosure to provide an apparatus which allows a horizontal pipe to be precisely laid in conjunction with the vertical pipe to facilitate a connection therebetween. Accordingly, the plumbing apparatus further comprises a horizontal pipe alignment guide formed using two additional securing rods and an alignment member. The additional securing rods are embedded astride a guide line on the installation surface which passes through the installation point. The alignment member is attached to the two additional securing rods, and has a centrally positioned alignment guide marker which is vertically aligned with the guide line. The horizontal pipe alignment guide allows the horizontal pipe to be laid centrally between the additional securing rods in alignment with the guide line.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 1A is a diagrammatical perspective view of a plumbing alignment target placement tool, in accordance with an embodiment in the present disclosure.

FIG. 1B is a diagrammatical front view of the plumbing alignment target, in accordance with an embodiment in the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 2:
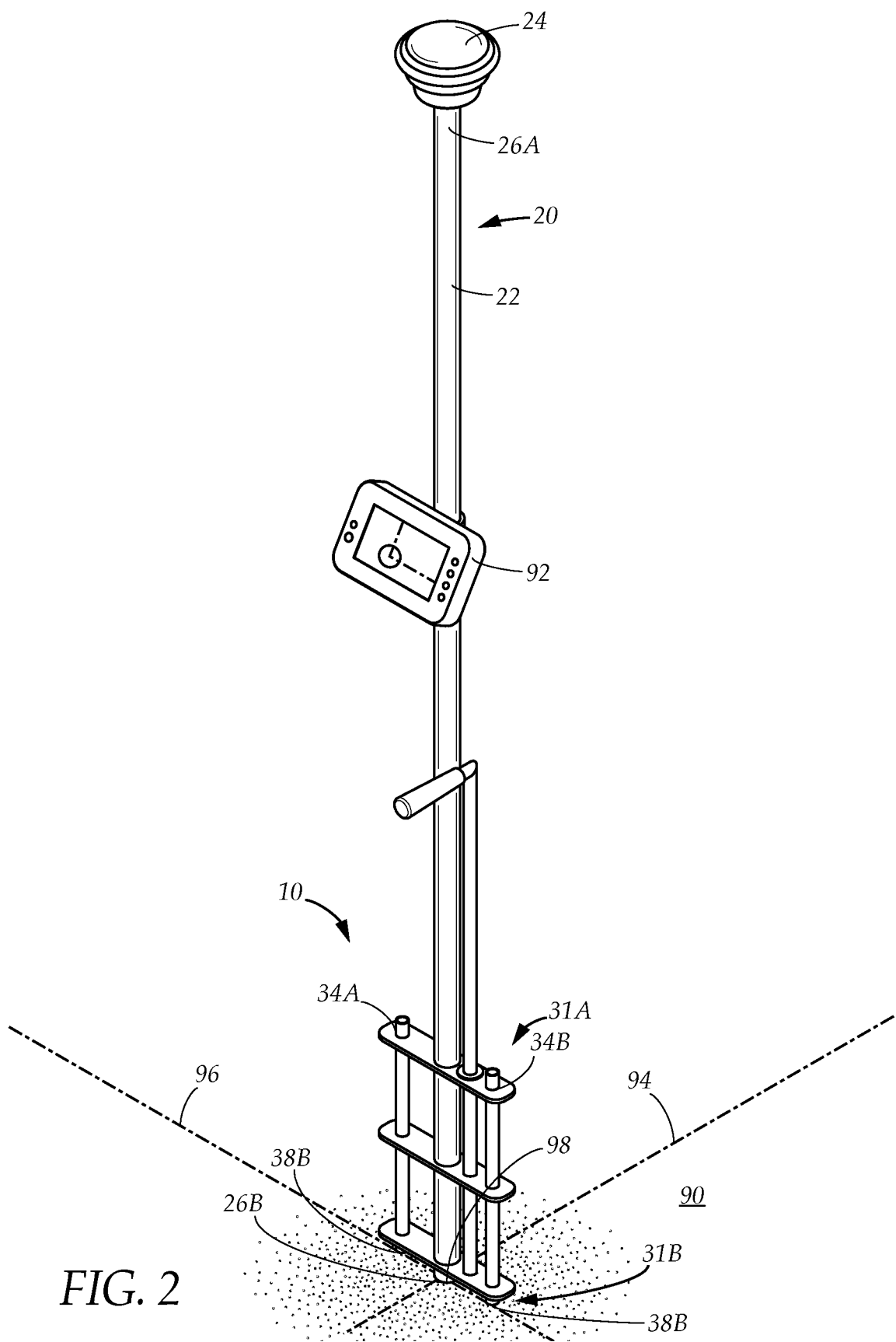
FIG. 2 is a diagrammatical perspective view of the plumbing target placement tool positioned perpendicularly upon an installation surface and in alignment with an installation point on the installation surface, in accordance with an embodiment in the present disclosure.
Figure 9:
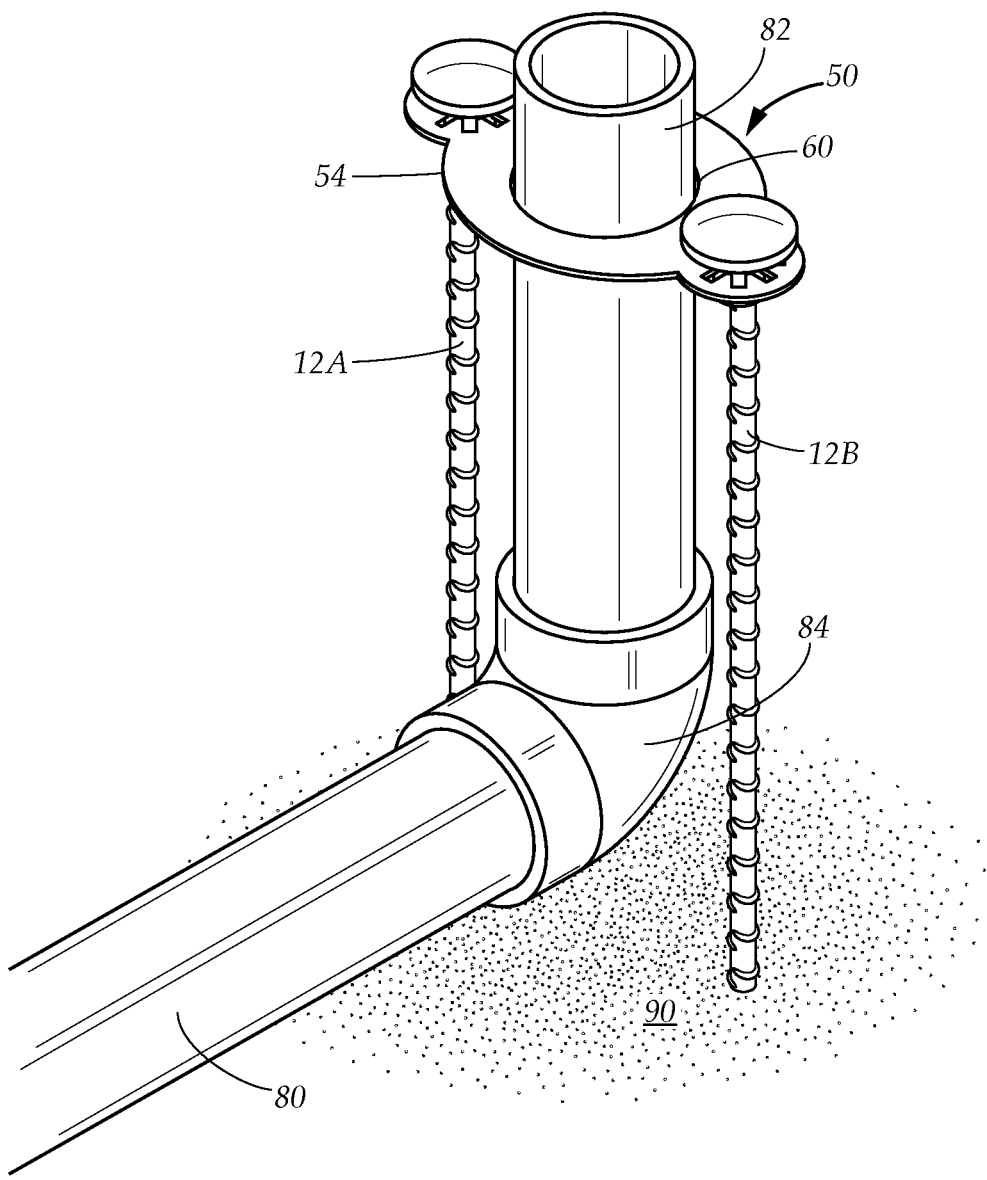
FIG. 9 is a diagrammatical perspective view of a vertical pipe projecting upwardly from the installation surface to pass perpendicularly through the pipe guide aperture of the pipe supporting member, in accordance with an embodiment in the present disclosure.

FIGS. 1A-B illustrate a plumbing target placement tool 10 comprising a guide structure 30 having a guide structure upper end 31A and a guide structure lower end 31B. The plumbing target placement tool further comprises a pair of securing rod guides, including a first securing rod guide 34A and a second securing rod guide 34B, which extend through the guide structure 30 between the guide structure upper end 31A and the guide structure lower end 31B, as well as an alignment means 20 disposed between the first and second securing rod guides 34A, 34B. Turning to FIG. 2 and FIG. 9 while also referring to FIGS. 1A-B, the plumbing target placement tool 10 allows a plumbing target guide 50 to be positioned upon an installation surface 90. The installation surface 90 is a horizontal surface upon which plumbing installation work is to be performed. The installation surface 90 may be gravel, dirt, sand, or any material in which underground plumbing pipes are installed. In one embodiment, the installation surface 90 may be a floor of a trench or ditch to facilitate below-ground installation of plumbing pipe. An installation point 98 is located on the installation surface 90, marking a position over which a vertical pipe 82 is to be installed. The plumbing target placement tool 10 further has an alignment means 20 disposed between the first and second securing rod guides 34A, 34B, which allows the plumbing target guide 50 to be precisely positioned over the installation point 98. The plumbing target guide 50 comprises a plurality of securing rods including a first securing rod 12A and a second securing rod 12B, and a pipe supporting member 54. The securing rods are partially embedded within the installation surface 90, and support the pipe supporting member 54.

Figure 3:
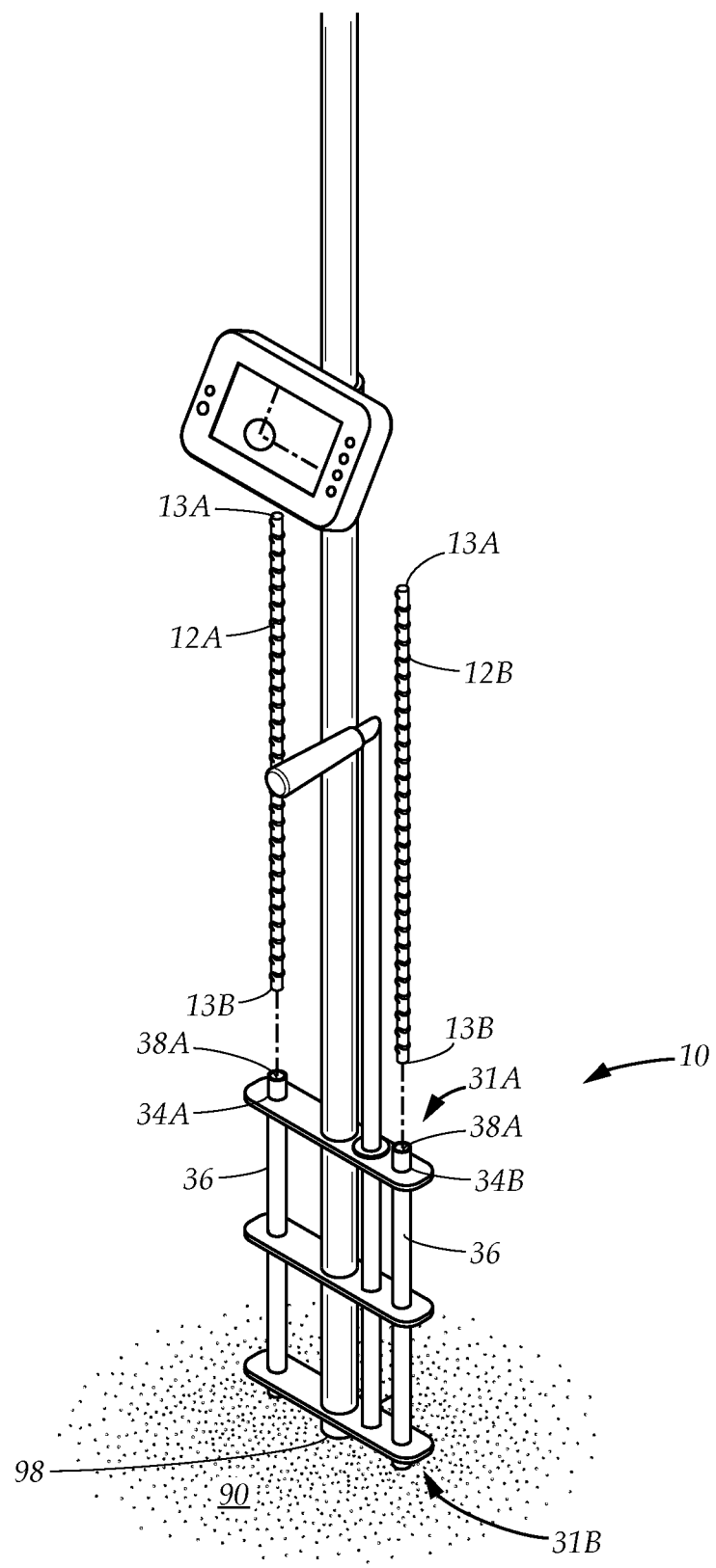
FIG. 3 is a diagrammatical perspective view of the plumbing target alignment tool positioned upon the installation surface, depicting two securing rods being inserted into securing rod guides passing vertically through the plumbing target alignment tool, in accordance with an embodiment in the present disclosure.

Turning briefly to FIG. 3 while also referring to FIG. 9, the first and second securing rod guides 34A, 34B of the plumbing target guide 50 allow the securing rods to remain correctly aligned while being embedded into the installation surface 90. The pipe supporting member 54 has a pipe guide aperture 60 which supports the vertical pipe 82 and allows the vertical pipe 82 to be precisely positioned, such that the vertical pipe 82 is both aligned with the installation point 98, and perpendicular to the installation surface 90.

Returning to FIGS. 1A-B while also referring to FIG. 2, the plumbing target placement tool 10 is positioned perpendicularly in relation to the installation surface 90 with the guide structure second end 34B pointing down towards the installation surface 90 while the guide structure first end 34A points upwardly away from the installation surface 90. The alignment means 20 allows the plumbing target placement tool 10 to be placed in alignment with the installation point 98, such that the installation point 98 is equidistant between the first and second securing rod guides 34A, 34B.

In a preferred embodiment, the guide structure 30 has an alignment guide aperture 44 which passes through the guide structure upper and lower ends 31A, 31B and is disposed equidistant between the first and second securing rod guides 34A, 34B. The alignment means 20 corresponds to a central alignment rod 22 which passes vertically through the guide structure via the alignment guide aperture 44. The central alignment rod 22 has a central alignment rod upper end 26A which projects upwardly, and a central alignment rod lower end 26B oriented downwardly towards the installation surface 90. The central alignment rod lower end 26B is positioned directly over the installation point 98. The central alignment rod upper end 26A may have an alignment reflector 24 attached thereto. The alignment reflector 24 may be used in conjunction with a theodolite, total station, or other device used for surveying or for taking measurements, as will be apparent to a person of ordinary skill in the art in the field of the invention.

The installation point 98 can be marked on the installation surface 90 using various techniques known to a person of ordinary skill in the art in the field of the invention. For example, the installation point 98 can correspond to an intersection point between a guide line 94 and a lateral guide line 96 drawn, marked, projected, or superimposed upon the installation surface 90, such as by using string, a laser projector, or other devices or techniques. Once the central alignment rod lower end 26B is positioned over the installation point 98, the first and second securing rod guides 34A, 34B can be aligned with the lateral guide line 96, such that the plumbing target placement tool 10 sits astride the guide line 94.

Note that the alignment means 20 may utilize other apparatuses, devices, or techniques which are known to a person of ordinary skill in the art. For example, in certain embodiments, the alignment means 20 may be implemented using an optical alignment guide in place of the central alignment rod 22. For example, the alignment guide aperture 44 may incorporate a visual alignment mark, which allows a user to accurately position the plumbing target alignment tool by visually aligning the alignment guide aperture 44 with the installation point 98.

Turning to FIG. 3 while also referring to FIGS. 1A-B, the first and second securing rod guides 34A, 34B are each adapted to receive the first securing rod 12A and the second securing rod 12B. The first and second securing rod guides 34A, 34B each comprise a rod guide channel 36 disposed between the guide structure upper end 31A and the guide structure lower end 31B. In one embodiment, the rod guide channels 36 are substantially tube shaped, and each rod guide channel 36 has a guide channel lower end 38B positioned at the guide structure lower end 31B.

The first and second securing rods 12A, 12B each have a rod upper end 13A, and a distally oriented rod lower end 13B. In one embodiment, the securing rods are pieces of rebar. The first and second securing rods 12A, 12B are held within the first and second securing rod guides 34A, 34B, with the rod lower ends 13B pointing downwardly. The rod lower ends 13B of the first and second securing rods 12A, 12B pass through the guide channel lower openings 38B of the first and second rod securing guides 34A, 34B to become embedded within the installation surface 90.

Figure 4:
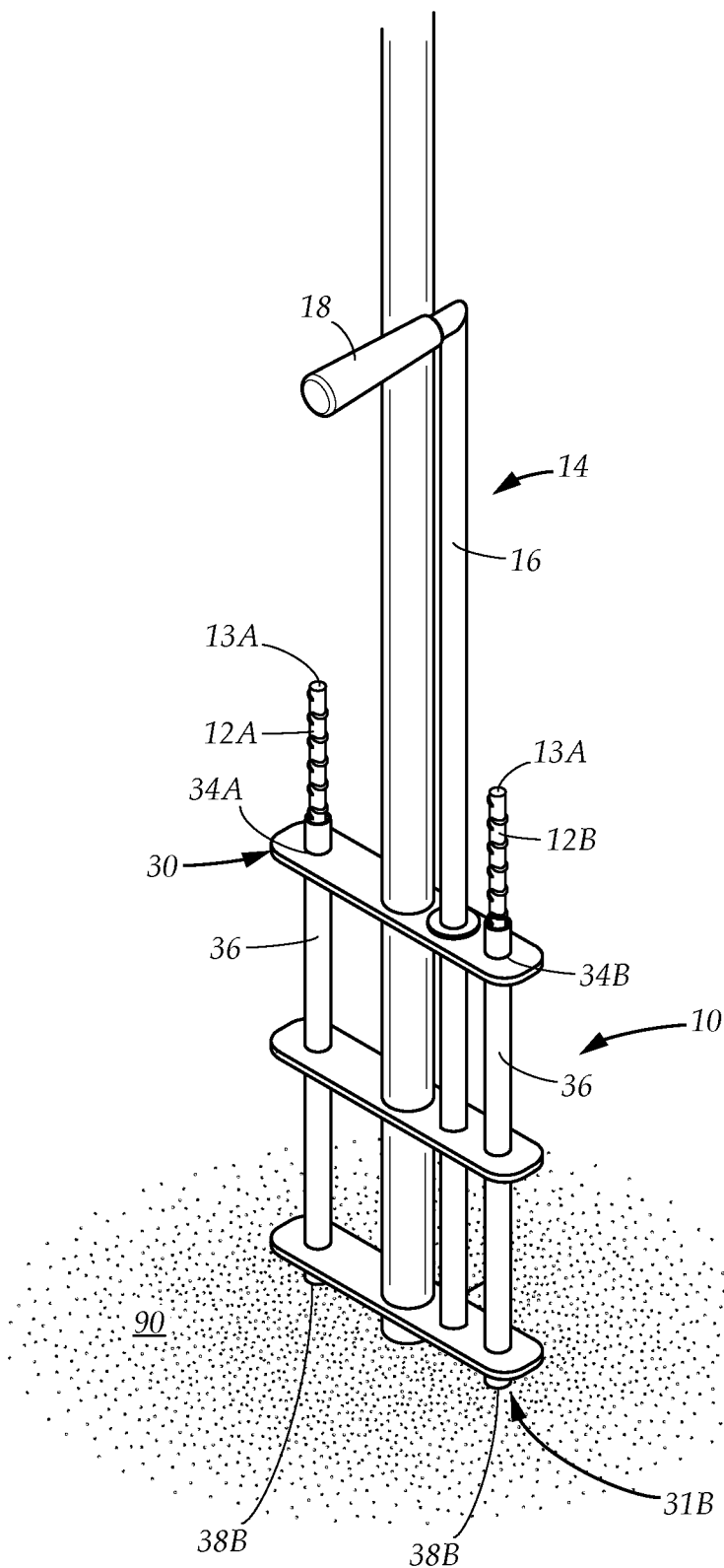
FIG. 4 is a diagrammatical perspective view of the plumbing target alignment tool, showing the securing rods being driven through the securing rod guides to become embedded into the installation surface, in accordance with an embodiment in the present disclosure.

Turning to FIG. 4 while also referring to FIG. 3, in one embodiment, the first and second securing rod guides 34A, 34B each have a guide channel upper opening 38A distally oriented in relation to the guide channel lower opening 38B. The guide channel upper openings 38A are accessible from the guide structure upper end 31A. The rod lower ends 13B of the first and second securing rods 12A, 12B are inserted into the guide channel upper openings 38A. The rod lower ends 13B pass through the rod guide channels 36 before abutting the installation surface 90, while the rod upper end 13A of the first and second securing rods 12A, 12B project upwardly past the guide channel upper openings 38A. In one embodiment, each securing rod measures approximately twenty-four inches in length, while each rod guide channel 36 measures approximately eighteen inches in length, allowing an eight-inch long portion of each securing rod to project upwardly away from the guide channel upper openings 38A.

Figure 5:
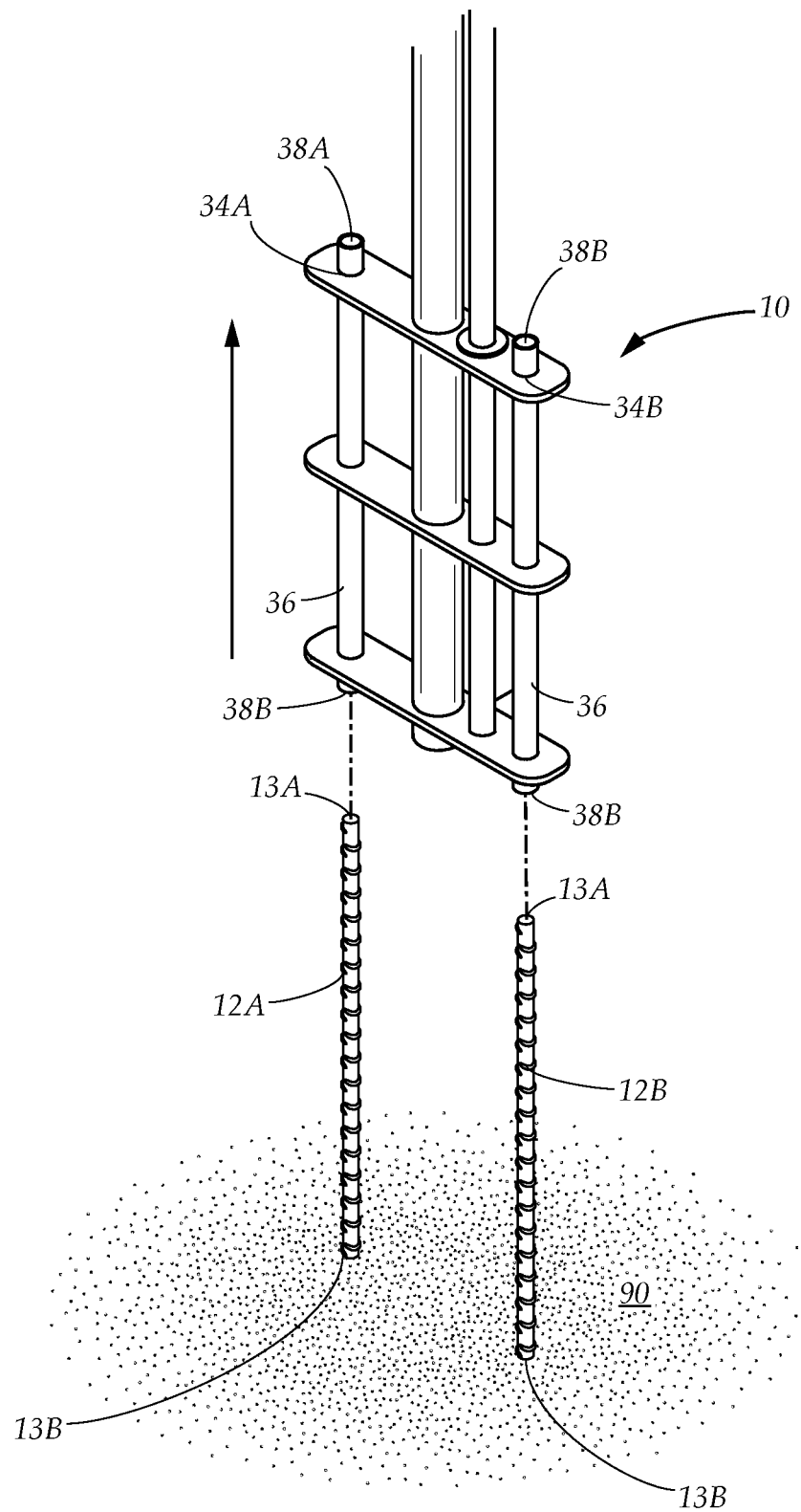
FIG. 5 is a diagrammatical perspective view showing the plumbing target alignment tool being removed while the two securing rods remain embedded within the installation structure, in accordance with an embodiment in the present disclosure.

Turning to FIG. 5 while also referring to FIG. 4, the securing rods are embedded into the installation surface 90 by pushing the first and second securing rods 12A, 12B downward through the first and second securing rod guides 34A, 34B. In certain embodiments, the rod lower ends 13B of the securing rods are driven into the installation surface 90 by exerting a downward force against the rod upper ends 13A, such as with the use of a hammer. The plumbing target placement tool 10 is lifted upwardly away from the installation surface 90, leaving the rod lower ends 13B of the first and second securing rods 12A, 12B embedded within the installation surface. In certain embodiments, the plumbing target placement tool 10 further comprises a carrying attachment 14 which allows a user to more easily lift or manipulate the plumbing target placement tool 10. For example, the carrying means 14 may correspond to a carrying rod 16 with a handle 18 which is attached to the guide structure 30.

Returning to FIGS. 1A-B while also referring to FIG. 2, the guide structure 30 of the plumbing target placement tool 10 may be implemented in various configurations while retaining the characteristics described in the present disclosure. In one embodiment, the guide structure 30 comprises a plurality of horizontal plates 40 arranged in parallel, with each horizontal plate 40 having a pair of guide channel apertures 48 which allow the guide channels 36 to pass through the horizontal plate 40. In one example, one of the horizontal plates 40 forms the guide structure upper end 31A, while another horizontal plate 40 forms the guide structure lower end 31B. A third horizontal plate 40 may be positioned between the guide structure upper and lower ends 31A, 31B. In certain embodiments, each horizontal plate 40 further has an aperture or opening centrally located between the guide channel apertures 48, corresponding to the alignment guide aperture 44.

Figure 6A:
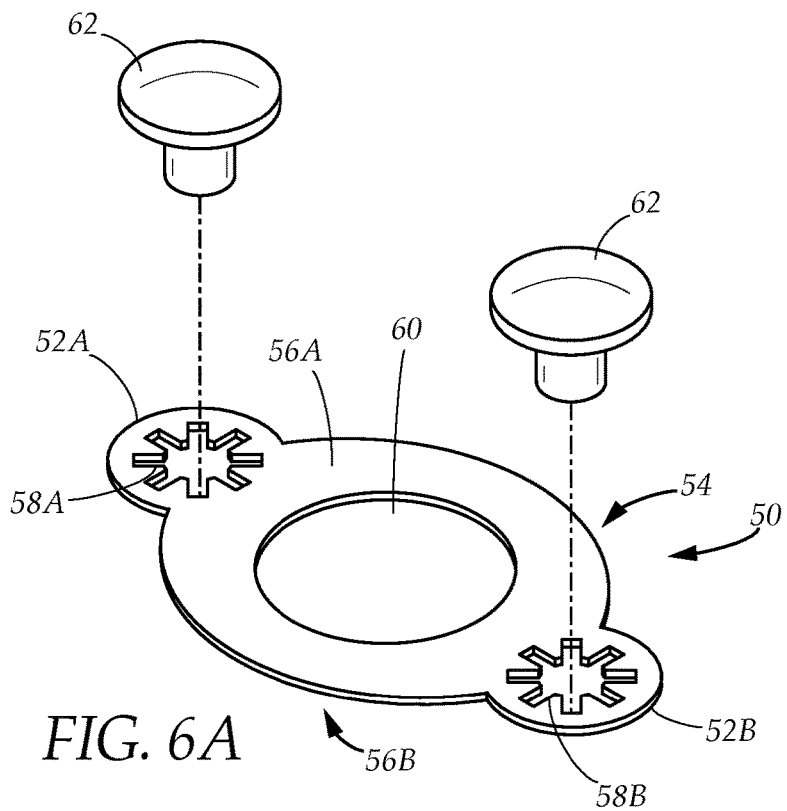
FIG. 6A is a diagrammatical exploded view of a pipe supporting member with a centrally disposed pipe guide aperture, a pair of securing rod attachment points, and a pair of securing rod caps inserted into the securing rod attachment points, in accordance with an embodiment in the present disclosure.
Figure 6B:
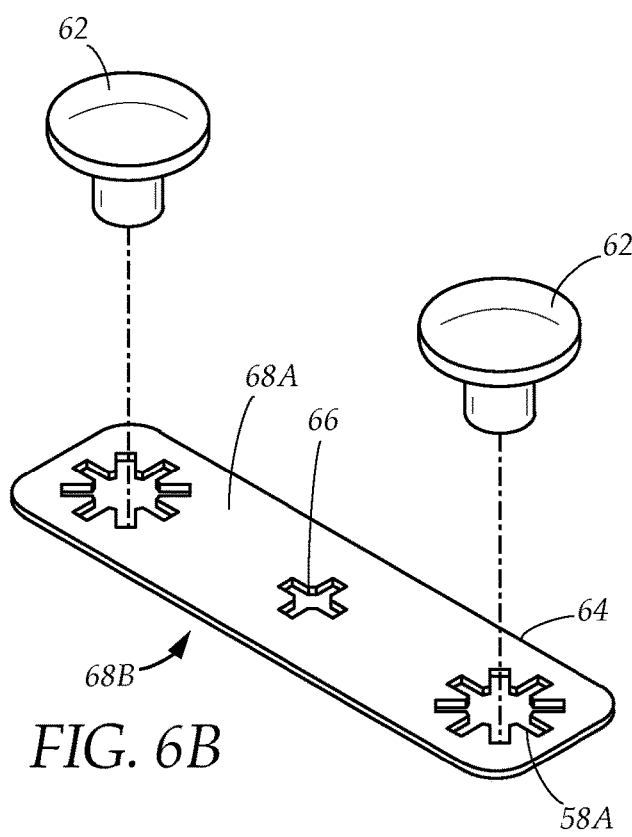
FIG. 6B is a diagrammatical exploded view of a pipe alignment guide with a centrally disposed alignment guide marker, a pair of securing rod attachment points, and two securing rod caps, in accordance with an embodiment in the present disclosure.
Figure 6C:
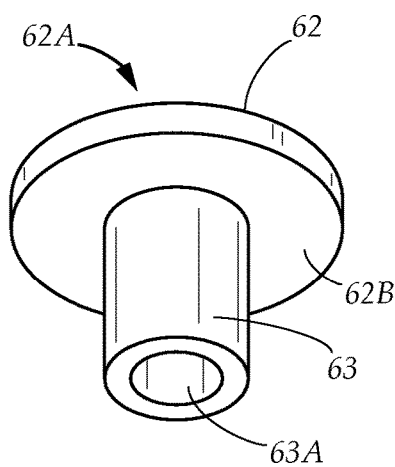
FIG. 6C is a diagrammatical perspective view of one of the securing rod caps, showing a cap projection and a securing rod receiving recess, in accordance with an embodiment in the present disclosure.
Figure 7:
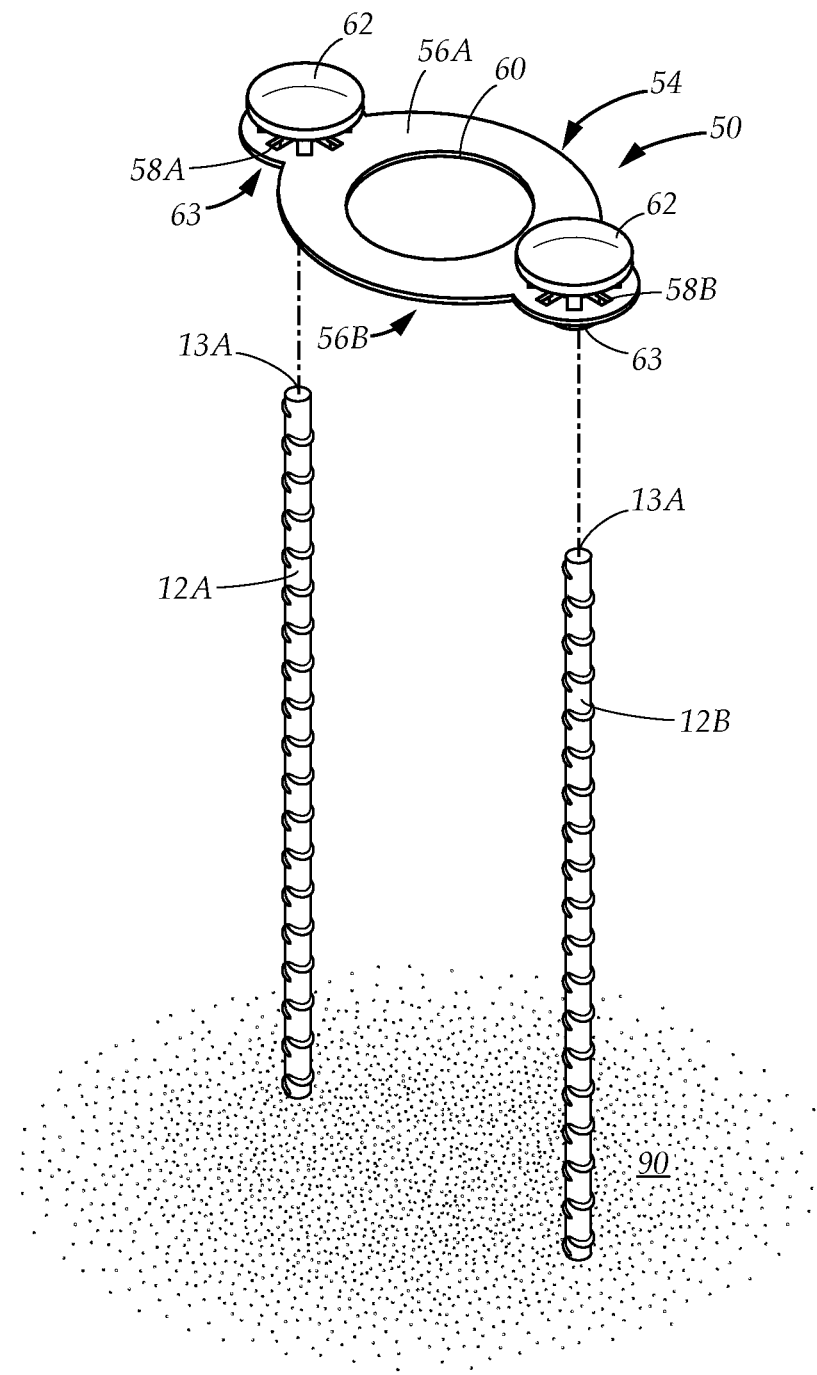
FIG. 7 is a diagrammatic perspective view of the pipe supporting member being attached to two securing rods projecting from the installation surface to create a plumbing target guide, in accordance with an embodiment in the present disclosure.

Turning to FIG. 7, while also referring to FIG. 6A and FIG. 6C, in a preferred embodiment, the plumbing target guide 50 is assembled by attaching the pipe supporting member 54 onto the first and second securing rods 12A, 12B. In a preferred embodiment, the pipe supporting member 54 has a first securing rod attachment point 58A and a second securing rod attachment point 58B, with the pipe guide aperture 60 disposed centrally therebetween. The first securing rod attachment point 58A and the second securing rod attachment point 58B are each adapted to detachably interlock with the first or second securing rods 12A, 12B.

In one embodiment the first and second securing rod attachment points 58A, 58B are formed as openings which allow securing rod caps 62 to be placed therein. The securing rod caps 62 may each have a cap projection 63 extending through the first and second securing rod attachment points 58A, 58B. To fix the securing rod cap 62 in place, the first and second securing rod attachment points 58A, 58B may incorporate a star-like pattern of projections which extend inwardly into the opening to grip the cap projection 63. Each cap projection 63 may have a securing rod receiving recess 63A which is adapted to receive the rod upper end 13A of either the first or the second securing rod 12A, 12B. The cap projection 63 may be formed of plastic or a similar material which allows the cap projection to frictionally engage both the first and second securing rod attachment points 58A, 58B and the rod upper ends 13A within the securing rod receiving recess 63A.

In one embodiment, the pipe supporting member 54 may have supporting member upper face 56A, with an oppositely disposed supporting member lower face 56B. The pipe guide aperture 60 and the first and second securing rod attachment points 58A, 58B each pass through the pipe supporting members 54 between the supporting member upper and lower faces 56A, 56B. The supporting member upper face 56A is substantially flat surrounding the first and second securing rod attachment points 58A, 58B. The securing rod cap 62 may have a cap upper face 62A and a flat cap lower face 62B from which the cap projection 63 extends perpendicularly. The securing rod caps 62 are inserted through the first securing rod attachment point 58A and the second securing rod attachment point 58B, with the cap lower face 62B of the securing rod caps 62 making flush contact with the pipe supporting member upper face 56A. The flush contact between the cap lower face 62B and the securing member upper face 56A ensures that the cap projection 63, as well as the first and second securing rods 12A, 12B, are perpendicular in relation to the pipe supporting member 54.

Note that in alternate embodiments, other attachment means may be employed to attach the pipe supporting member 54 to the first and second securing rods 12A, 12B, such as open clips or other means as will be apparent to a person of ordinary skill in the art in the field of the invention.

Figure 8:
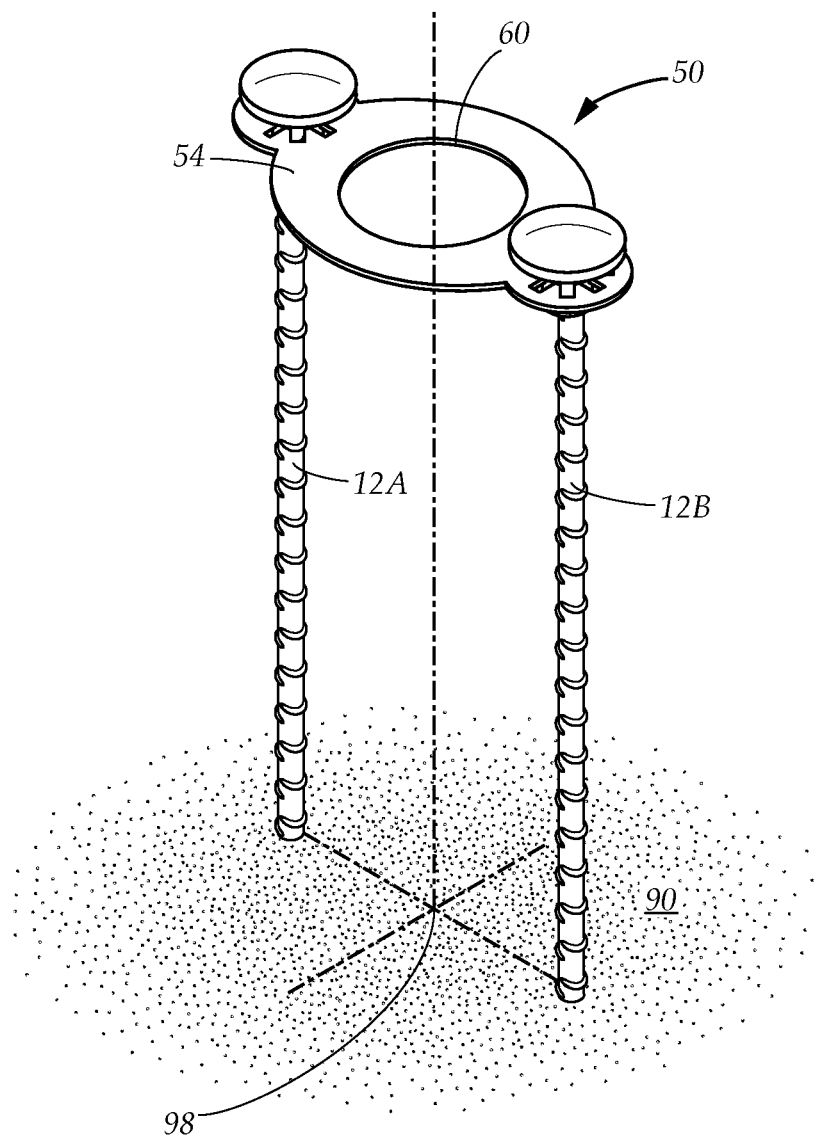
FIG. 8 is a diagrammatical perspective view of the completed plumbing target guide, in accordance with an embodiment in the present disclosure.

Turning to FIG. 8 and FIG. 9, once the plumbing target guide 50 is assembled, the pipe supporting member 54 is parallel with the installation surface 90, with the pipe guide aperture 60 positioned above and in alignment with the installation point 98. The vertical pipe 84 is inserted lengthwise through the pipe guide aperture 60 while remaining in alignment with the installation point 98. The pipe supporting member 54 continues to support the vertical pipe 82 as vertical pipe 82 is attached to other elements of pipework. For example, the vertical pipe 82 can be attached to a horizontal pipe 80 running parallel with the installation surface 90 via a fitting 84, such as an elbow fitting or a T-shaped fitting. The pipe guide aperture 60 may be configured with various diameters to accommodate vertical pipes 82 of different sizes. The diameter of the pipe guide aperture 60 may be nearly equal to or slightly larger than the diameter of the vertical pipe 82.

Figure 10:
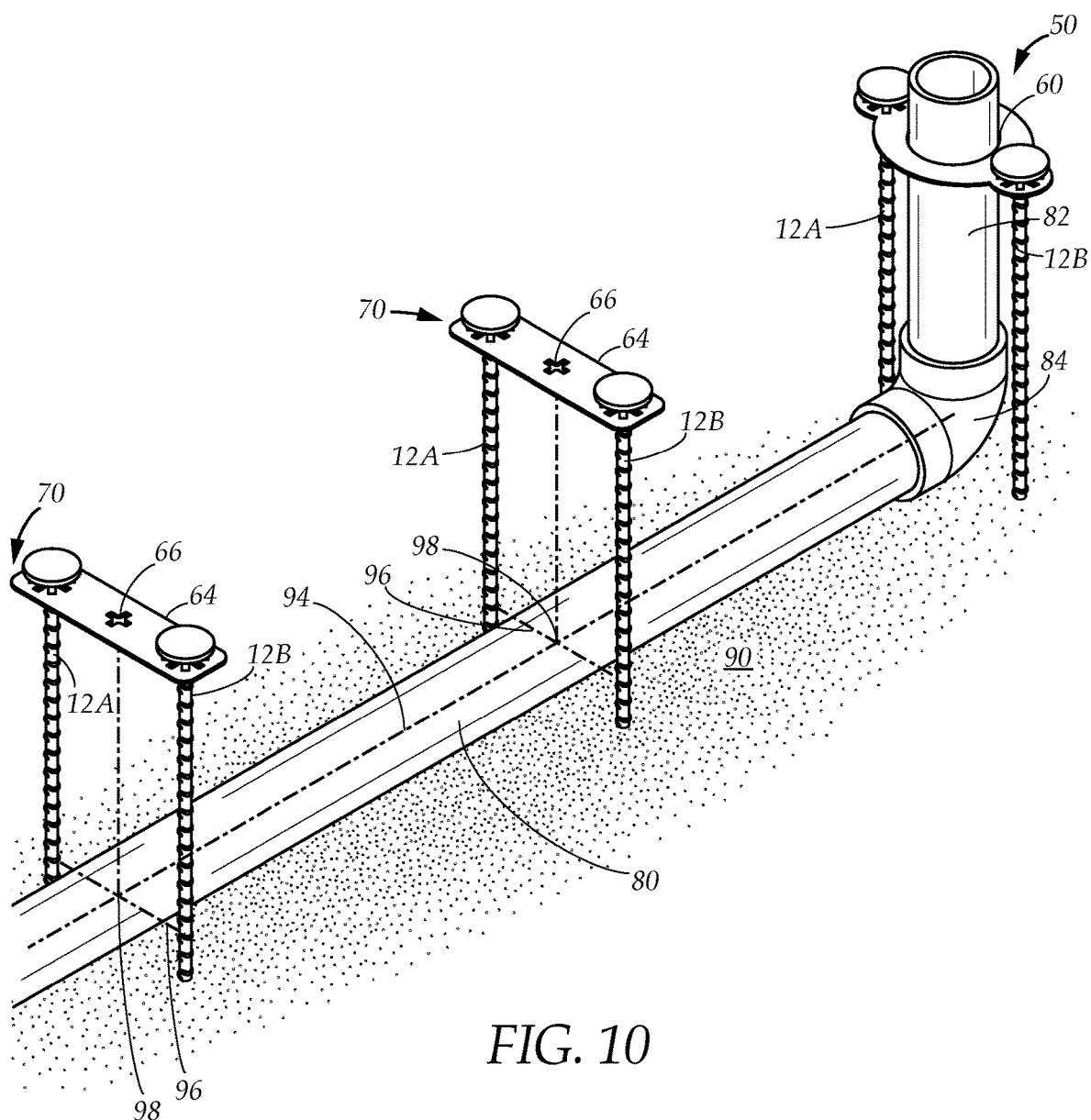
FIG. 10 is a diagrammatical perspective view of a series of horizontal pipe alignment guides which allow a horizontal pipe to be aligned in relation to the installation surface, in accordance with an embodiment in the present disclosure.

Turning to FIG. 10 while also referring to FIGS. 6A-B and FIG. 2, the plumbing target placement tool 10 may be used to place a horizontal pipe alignment guide 70 upon the installation surface 90 instead of a plumbing target guide 50. The pipe alignment guide 70 is used to assist in aligning a horizontal pipe 80 with the guide line 94. In a preferred embodiment, the pipe alignment guide 70 comprises an alignment member 64 having a first securing rod attachment point 58A, a second securing rod attachment point 58B, and an alignment guide marker 66 which is positioned centrally therebetween. The alignment member 64 may have an upper face 68A and a lower face 68B. The first and second securing rod attachment points 58A, 58B allow the alignment member 64 to be attached to a first and second securing rod 12A, 12B in a manner substantially similar to the pipe supporting member 54. In a preferred embodiment, securing rod caps 62 are used to secure the alignment member 64 to the first and second securing rods 12A, 12B.

In one example, the horizontal pipe 80 may be placed with the assistance of one or more horizontal pipe alignment guides 70, each positioned in alignment with the guide line 94. This allows both the horizontal pipe 80 and the vertical pipe 82 to be placed in alignment with the guide line 94, thus avoiding potential misalignments which would prevent a proper connection between the vertical and horizontal pipes 82, 80. The placement of the horizontal pipe alignment guides 70 may be facilitated by marking additional placement points 98 along the guide line 94. Additional first and second securing rods 12A, 12B are embedded into the installation surface 90 using the plumbing target placement tool 10, with the first and second securing rods 12A, 12B straddling the guide line 94. The alignment guide marker 66 is positioned above, and is directly aligned with, the installation point 98. In a preferred embodiment, the alignment guide marker 66 forms an opening that passes through the upper and lower faces 68A, 68B of the alignment member, allowing a user to look through the alignment guide member 64 to view the installation surface 90, the horizontal pipe 80, or other objects below the horizontal pipe alignment guide 70. In one embodiment, alignment guide marker 66 is substantially cross-shaped, allowing the alignment guide marker 66 to align with both the guide line 98 and the lateral guide line 96. Note that the alignment guide marker 66 can be any marking or apparatus which facilitates visual alignment.

The horizontal pipe 80 may be laid out along the installation surface 90 in alignment with the guide line 94 by placing the horizontal pipe between the first and second securing rods 12A, 12B of the horizontal pipe alignment guides 70. To increase precision of the alignment, the horizontal pipe 80 may be positioned centrally and equidistant between the securing rods with the alignment guide marker 66 positioned centrally above the horizontal pipe 80. In certain embodiments, visible guide marks may be placed on the horizontal pipe to facilitate the adjustment.

Once the plumbing installation is complete, the plumbing target guide 50 and any horizontal pipe alignment guides 70 can be left in place or be disassembled and removed from the installation surface 90.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a plumbing target and placement tool. The disclosure is illustrated by example in the drawing figures, and throughout the written description. It should be understood that numerous variations are possible, while adhering to the inventive concept. Such variations are contemplated as being a part of the present disclosure.

What is claimed is:

1. A plumbing alignment apparatus for placing and supporting a vertical pipe in relation to an installation surface during plumbing installation, comprising:
   a plumbing target guide, the plumbing target guide having a first securing rod, a second securing rod, and a pipe supporting member, the pipe supporting member having a pipe guide aperture adapted to receive the vertical pipe, the first and second securing rods each having a securing rod upper end and a securing rod lower end;
   a plumbing target placement tool having a guide structure with a guide structure upper end and a guide structure lower end, the guide structure further having a first securing rod guide and a second securing rod guide, the plumbing target placement tool is adapted to be positioned perpendicularly over the installation surface with the guide structure lower end positioned downwardly, the first and second securing rod guides are adapted to receive and support the first and second securing rods in a position perpendicular to the installation surface, the first and second securing rod guides are adapted to allow the first and second securing rods to be pushed downwardly towards the installation surface, allowing the securing rod lower ends of the first and second securing rods to be embedded into the installation surface; and
   wherein the pipe supporting member is attached to the first and second securing rods, allowing the vertical pipe to be vertically inserted through the pipe guide aperture to be supported perpendicularly in relation to the installation surface.

2. The plumbing alignment apparatus as described in claim 1, wherein the first securing rod guide and the second securing rod guide each have a guide channel extending between the guide structure upper end and the guide structure lower end which is adapted to receive the first or second securing rod, each guide channel having a guide channel lower opening which allows the securing rod lower end of the first and second securing rods to pass through the guide structure lower end to become embedded within the installation surface.

3. The plumbing alignment apparatus as described in claim 2, wherein:
   the guide structure further has an alignment means which allows the plumbing target displacement tool to be aligned with an installation point on the installation surface, such that the installation point is equidistant between the first and second securing rods; and
   wherein the pipe guide aperture is positioned above and in vertical alignment with the installation point after being attached to the first and second securing rods.

4. The plumbing alignment apparatus as described in claim 3, wherein each guide channel has a guide channel upper opening which allows the first and second securing rods to be downwardly inserted into the guide channels of the first and second securing rod guide.

5. The plumbing alignment apparatus as described in claim 4, wherein the securing rod upper ends of the first and second securing rods extend upwardly past the guide channel upper openings after being inserted into the securing rod guide channels, allowing the first and second securing rods to be pushed downwardly through the securing rod guide channels by applying a downward force upon the securing rod upper ends.

6. The plumbing alignment apparatus as described in claim 5, further comprising a horizontal pipe alignment guide, the horizontal pipe alignment guide having an additional first securing rod, an additional second securing rod, and an alignment member attached to the additional first and second securing rods, the alignment member having an alignment guide marker, the additional first and second securing rods are embedded into the installation surface using the plumbing target placement tool, the additional first and second securing rods are embedded astride a guide line that passes along the installation surface through the installation point, the alignment member is positioned above the installation surface with the alignment guide marker vertically aligned with the guide line, allowing a horizontal pipe to be laid down between the additional first and second securing rods in alignment with the alignment guide marker.

7. The plumbing alignment apparatus as described in claim 6, wherein:
   the pipe supporting member has a first securing rod attachment point and a second securing rod attachment point with the pipe guide aperture positioned equidistant therebetween, the pipe supporting member is attached to the securing rod upper ends of the first and second securing rods via the first and second securing rod attachment points.

8. The plumbing alignment apparatus as described in claim 7, further comprising: a plurality of securing rod caps, each cap having a cap lower face and a cap projection extending perpendicularly therefrom, one of the securing rod caps is inserted through each of the first and second securing rod attachment points, whereby the securing rod upper ends of the first securing rod and the second securing rod are engaged with the cap projections within the first and second securing rod attachment points.

9. A method for placing and supporting a vertical pipe in relation to an installation surface during plumbing installation, comprising the steps of:
   providing a first securing rod, a second securing rod, and a pipe supporting member, the first and second securing rods each have a securing rod upper end and securing rod lower end;
   providing a plumbing target placement tool having a guide structure with a guide structure upper end and a guide structure lower end, the guide structure further having a first securing rod guide and a second securing rod guide;
   positioning the plumbing target placement tool perpendicularly over the installation surface with the guide structure lower end facing downwardly;
   inserting the first securing rod into the first securing rod guide and inserting the second securing rod into the second securing rod guide;
   pushing the first and second securing rods downwardly through the first and second securing rod guides;
   embedding the securing rod lower ends of the first and second securing rods within the installation surface;
   removing the plumbing target placement tool and leaving the first and second securing rods to project perpendicularly away from the installation surface;
   attaching the pipe supporting member to the first and second securing rods with a pipe guide aperture parallel with the installation surface; and vertically inserting the vertical pipe through the pipe guide aperture, and supporting the vertical pipe perpendicularly in relation to the installation surface.

10. The method as recited in claim 9, wherein:
the guide structure further has an alignment means positioned equidistant between the first and second securing rod guides;
the step of positioning the plumbing target placement tool is followed by the step of placing the alignment means in vertical alignment with an installation point on the installation surface; and
the step of embedding the securing rod lower ends further comprises embedding the securing rod lower ends of the first and second securing rods within the installation surface with the installation point equidistant between the first and second securing rods.

11. The method as recited in claim 10, wherein:
the first and second securing rod guides each have a guide channel extending between the guide structure upper end and the guide structure lower end, each guide channel has a guide channel lower opening; and
the step of pushing the first and second securing rods further comprises pushing the first and second securing rods downwardly through the first and second securing rod guides and projecting the securing rod lower ends past the guide structure lower end through the guide channel lower openings.

12. The method as recited in claim 11, wherein:
each guide channel has a guide channel upper opening; and
the step of inserting the first securing rod further comprises inserting the first and second securing rods through the guide channel upper openings of the first and second securing rod guides.

13. The method as recited in claim 12, wherein:
the first and second securing rods are longer than the guide channels;
the step of inserting the first securing rod further comprises allowing the securing rod upper ends of the first and second securing rods to project upwardly through the guide channel upper openings; and
the step of pushing the first and second securing rods further comprises exerting a downward force upon the securing rod upper ends.

14. The method as recited in claim 13, wherein:
the step of removing the plumbing target placement tool further comprises lifting the plumbing target placement tool away from the installation surface until the securing rod upper ends exit the guide channel lower openings.

15. The method as recited in claim 14, wherein:
the pipe supporting member has a first securing rod attachment point and a second securing rod attachment point, with the pipe guide aperture positioned therebetween; and
the step of attaching the pipe supporting member further comprises attaching the first securing rod to the first securing rod attachment point and attaching the second securing rod to the second securing rod attachment point.

16. The method as recited in claim 15, wherein:
the step of providing a plumbing target placement tool is followed by the step of providing an alignment member having an alignment guide marker;
the step of removing the plumbing target placement tool is followed by the step of placing the plumbing target placement tool along a guide line that passes along the installation surface through the installation point, aligning the alignment means with the guide line, embedding upon the installation surface an additional first securing rod and an additional second securing rod astride the guide line, and removing the plumbing target placement tool; and
the step of attaching the pipe supporting member is followed by the step of attaching the alignment member to the additional first and second securing rods, supporting the alignment member above the installation surface with the alignment marker vertically aligned with the guide line, laying a horizontal pipe between the additional first securing rod and the additional second securing rod, and centering the horizontal pipe therebetween using the alignment guide marker.

17. The method as recited in claim 16, wherein the step of vertically inserting the vertical pipe is followed by the step of connecting the vertical pipe to the horizontal pipe using a plumbing fitting.

* * * * *